(12) United States Patent
Amesar et al.

(10) Patent No.: US 7,648,199 B2
(45) Date of Patent: Jan. 19, 2010

(54) ENERGY ABSORBING TETHER FOR CHILD SAFETY SEAT

(75) Inventors: Pankaj Tulsidas Amesar, Charlotte, NC (US); Said Nakhla, Clarkston, MI (US); Phillip Przybylo, Waxhaw, NC (US); James R. Tobin, Tega Kay, SC (US)

(73) Assignee: Britax Child Safety, Inc., Charlotte, NC (US)

( * ) Notice: Subject to any disclaimer, the term of this patent is extended or adjusted under 35 U.S.C. 154(b) by 2 days.

(21) Appl. No.: 12/241,383

(22) Filed: Sep. 30, 2008

(65) Prior Publication Data

US 2009/0026815 A1 Jan. 29, 2009

Related U.S. Application Data

(62) Division of application No. 11/745,061, filed on May 7, 2007.

(51) Int. Cl.
  *B60N 2/42* (2006.01)
  *B60R 21/00* (2006.01)
(52) U.S. Cl. .................... 297/216.11; 297/472
(58) Field of Classification Search .......... 297/252, 297/250.1, 253, 216.11, 472
  See application file for complete search history.

(56) References Cited

U.S. PATENT DOCUMENTS

| | | | |
|---|---|---|---|
| 4,099,770 A | 7/1978 | Elsholz et al. | |
| RE29,841 E | 11/1978 | Wener | |
| 5,383,708 A | 1/1995 | Nagasaka et al. | |
| 5,658,012 A | 8/1997 | Villarreal et al. | |
| 5,695,243 A | 12/1997 | Anthony et al. | |
| 5,836,649 A | 11/1998 | Bonetti | |
| 6,095,604 A | 8/2000 | Stack et al. | |
| 6,189,970 B1 | 2/2001 | Rosko | |
| 6,267,442 B1 | 7/2001 | Shiino et al. | |
| 6,416,129 B1 | 7/2002 | Hirota | |
| 6,543,847 B2 | 4/2003 | Balensiefer | |
| 6,619,752 B1 | 9/2003 | Glover | |
| 6,869,141 B2 | 3/2005 | Yamaoka et al. | |
| 7,506,929 B2 * | 3/2009 | Fransen et al. ........... 297/250.1 |
| 2003/0047972 A1 | 3/2003 | Burleigh et al. | |
| 2004/0041450 A1 | 3/2004 | Yamaoka et al. | |
| 2004/0095004 A1 | 5/2004 | Horton et al. | |
| 2004/0178668 A1 | 9/2004 | Kassai et al. | |
| 2004/0178669 A1 | 9/2004 | Lady et al. | |
| 2004/0212232 A1 | 10/2004 | Sedlack | |
| 2004/0262966 A1 | 12/2004 | Hosoya | |
| 2005/0006934 A1 | 1/2005 | Rabeony et al. | |
| 2005/0035635 A1 | 2/2005 | Hendrikus | |
| 2006/0076812 A1 | 4/2006 | Ward | |
| 2006/0220427 A1 | 10/2006 | Patrizi et al. | |
| 2006/0261649 A1 | 11/2006 | Baldwin et al. | |
| 2007/0057544 A1 | 3/2007 | Nakhla et al. | |
| 2007/0241596 A1 | 10/2007 | Merrill | |
| 2007/0241598 A1 | 10/2007 | Perry | |

\* cited by examiner

*Primary Examiner*—David Dunn
*Assistant Examiner*—James Alex
(74) *Attorney, Agent, or Firm*—Adams Intellectual Property Law

(57) ABSTRACT

An energy absorbing tether assembly for use with a child safety seat of the type having a pair of spaced apart slots in a shell.

8 Claims, 17 Drawing Sheets

ENERGY ABSORBING TETHER FOR CHILD SAFETY SEAT

CROSS REFERENCE TO RELATED APPLICATION

This is a divisional application of co-pending U.S. application Ser. No. 11/745,061, filed on May 7, 2007, the disclosure of which is incorporated herein in its entirety.

BACKGROUND OF THE INVENTION

This invention relates to child safety seats, and more particularly to an apparatus for mounting child safety seats in vehicles.

Child safety seats typically include a tether which is used to anchor the upper portion of the seat to a motor vehicle. During a crash, this tether is placed under tension loads as the vehicle decelerates. These tethers are usually constructed of a material which exhibits stretch, and therefore provides some energy absorption. However, their mounting is typically rigid and therefore absorption is limited to the stretch available in the free length of the tether. Accordingly, there is a need for a tether which offers increased energy absorption in the event of a crash.

SUMMARY OF THE INVENTION

This need is met by the present invention, which provides, it is an object to provide a child safety seat tether that is adapted to slip through its mountings under crash loads.

It is another object of the invention to provide a child safety seat tether that increases the length of tether material available to stretch under crash loads.

It is another object of the invention to provide a child safety seat tether that increases the length of tether material available to stretch under crash loads.

It is another object of the invention to provide a child safety seat tether that includes a convenient carrying handle.

These and other objects of the present invention are achieved in the preferred embodiments disclosed below by providing a tether assembly for use with a child safety seat in a vehicle. The seat is of the type having a pair of spaced apart slots in a shell. The tether assembly includes a length of webbing for routing through the spaced apart slots in the shell and a first and second slides for disposition along the length of webbing to retain webbing in one of the spaced apart slots. An adjuster is connected to the length of webbing and a hook is for securing the seat in the vehicle.

According to another preferred embodiment of the invention, the first and second slides are three bar slides.

According to another preferred embodiment of the invention, the length of webbing is flexible.

According to another preferred embodiment of the invention, the webbing is routed through the slides to permit slippage.

According to another preferred embodiment of the invention, the portion of the length of webbing forming the handle is folded over and stitched together.

According to another preferred embodiment of the invention, movement of the slides is limited by the shell.

According to another preferred embodiment of the invention, stitching is included for frangibly connecting the length of webbing to itself on the back side of the shell.

According to another preferred embodiment of the invention, the slides are larger than the slots.

According to another preferred embodiment of the invention, a tether assembly for use with a child safety seat of the type having a pair of spaced apart slots in a shell includes a first length of webbing for routing through an adjuster and a second length of webbing fixed to the adjuster. A first slide is for disposition along the first length of webbing to retain webbing of the first length in one of the spaced apart slots and a second slide for disposition along the second length of webbing to retain webbing of the second length in the other of the spaced apart slots.

According to another preferred embodiment of the invention, the assembly includes a hook having an opening for receiving one of the lengths of webbing.

According to another preferred embodiment of the invention, the seat is for use in a vehicle and the hook is for securing the seat to the vehicle.

According to another preferred embodiment of the invention, the first and second slides are three bar slides.

According to another preferred embodiment of the invention, the lengths of webbing are routed through the slides to permit slippage.

According to another preferred embodiment of the invention, the slides are larger than the slots.

According to another preferred embodiment of the invention, the assembly includes stitching for frangibly coupling portions of the length of webbing together on a back side of the shell.

According to another preferred embodiment of the invention, a tether assembly for use with a child safety seat of the type having a pair of spaced apart slots in a shell includes a first length of webbing for routing through an adjuster and a second length of webbing fixed to the adjuster. A first slide is for disposition along the first length of webbing on a front side of the shell to retain webbing of the first length in one of the spaced apart slots and a second slide is for disposition along the second length of webbing on a front side of the shell to retain webbing of the second length in the other of the spaced apart slots. The assembly further includes stitching for permanently coupling portions of the first length together to retain the first slide on the front side of the shell and stitching for permanently coupling portions of the second length together to retain the second slide on the front side of the shell.

In another preferred embodiment of the invention, the assembly further includes a hook having an opening for receiving the second length of webbing.

In another preferred embodiment of the invention, the assembly includes stitching for frangibly coupling portions of the first length of webbing together and portions of the second length of webbing together on one side of the shell to provide slack loops.

In another preferred embodiment of the invention, the slack loops are provided on the front side of the shell.

In another preferred embodiment of the invention, the slack loops are provided on the back side of the shell.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
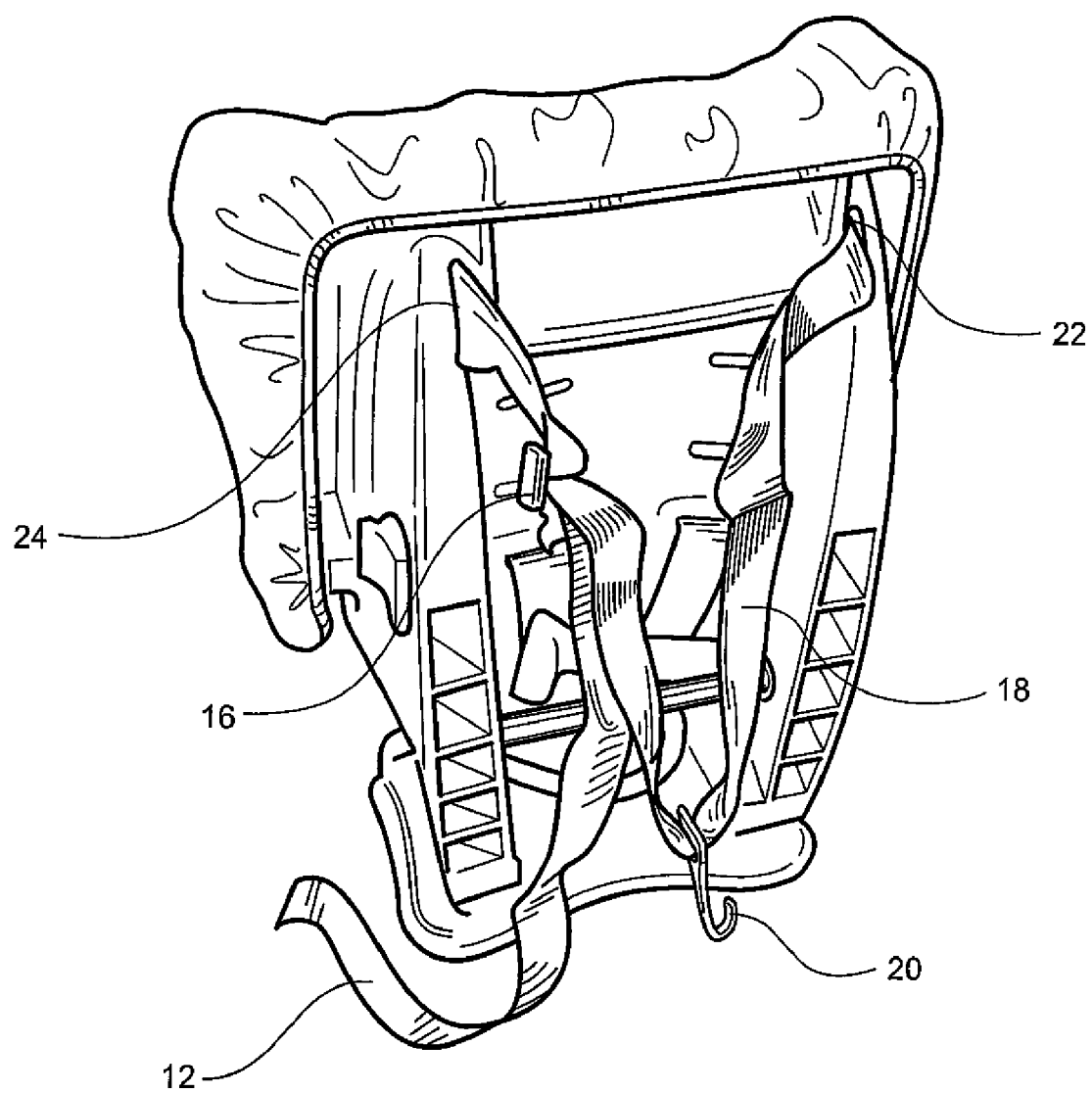
FIG. 1 is a perspective view of a child safety seat including a tether constructed according to a first embodiment of the present invention.
Figure 2:
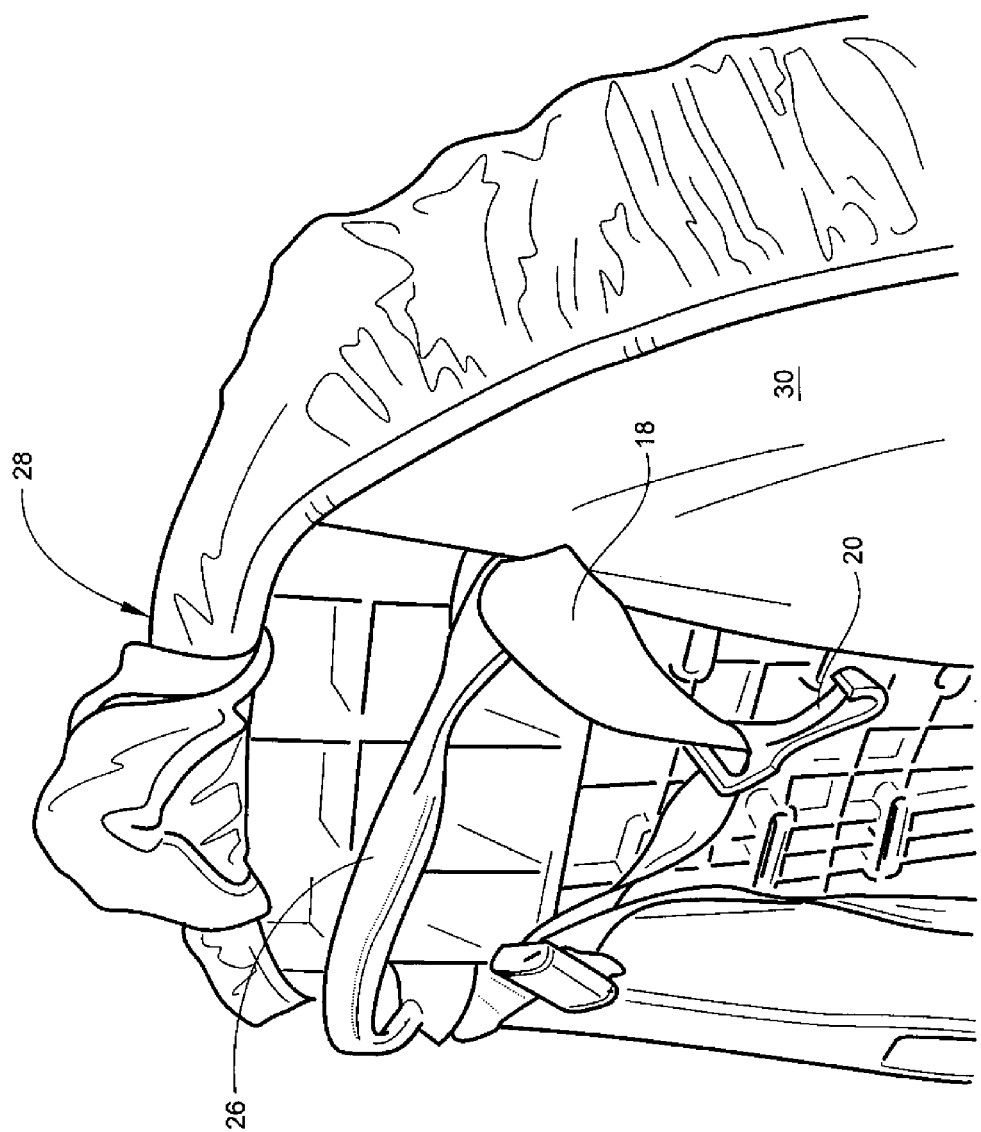
FIG. 2 is a rear perspective view of the tether of FIG. 1 attached to a child safety seat.

Referring now to the drawings wherein like reference numerals indicate the same components throughout the various views, FIGS. 1 and 2 illustrate a first exemplary embodiment of a tether 10 for use with a child safety seat. Its main component is a single length of webbing 12, for example nylon or other suitable flexible material. A free end 14 of the webbing 12 is routed through an adjuster 16 of a known type, and then extends laterally to form a loop 18. A hook 20 slides along this loop 18. The webbing 12 is routed through a first slide 22 of a known type, such as a 3-bar slide, and then laterally across to a second slide 24, and finally terminates at a fixed connection to the adjuster 16. The portion of the webbing 12 between the slides 22 and 24 is folded together and sewn to define an oval or round cross-section carrying handle 26. An internal form such as padding (not shown), which may be energy absorbing, may be used to help define the handle shape. An external form may also be added to the webbing that defines the carrying handle 26, which could be made of an energy absorbing material (not shown).

Figure 3:
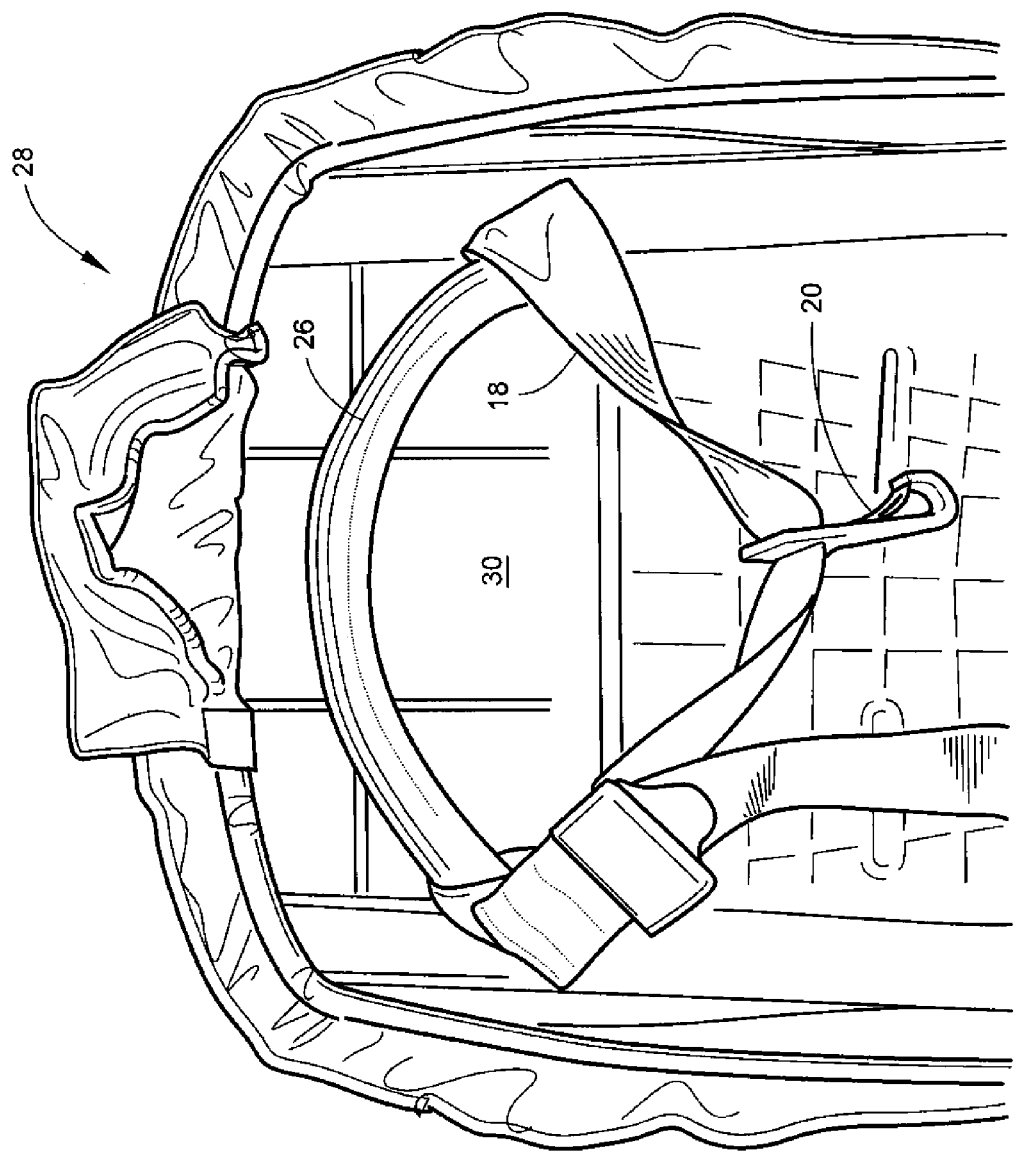
FIG. 3 is a rear view of the tether of FIG. 1 attached to a child safety seat.
Figure 4:
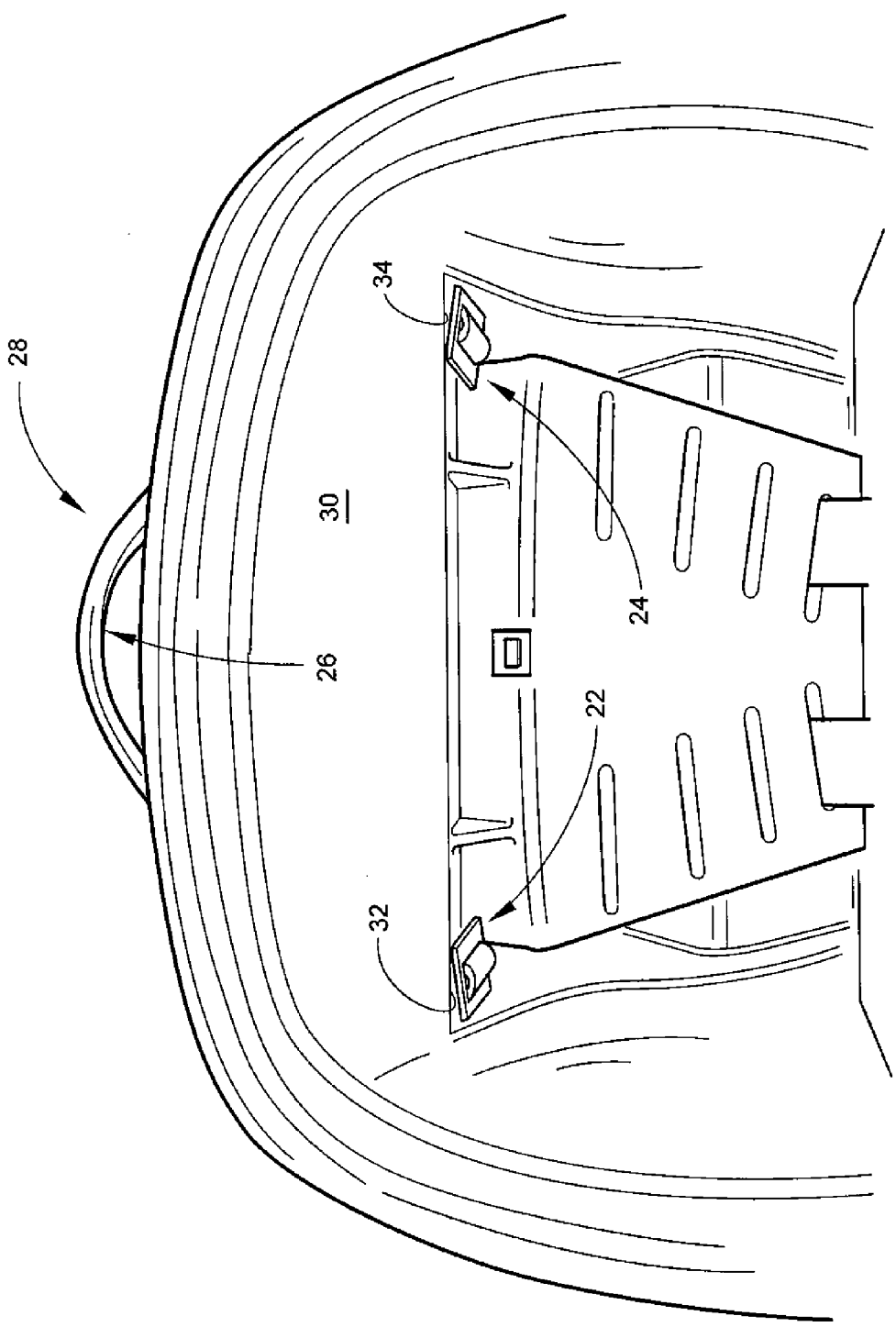
FIG. 4 is a front view of the tether of FIG. 1 attached to a backshell of a child safety seat.

FIGS. 3 and 4 show how the tether 10 may be mounted to a child safety seat 28 which includes a backshell 30. Portions of the webbing 12 are routed through laterally-spaced-apart slots 32 and 34 in the backshell 30, which are large enough to accept the webbing 12 but smaller than the surface area of the slides 22 and 24. The slides 22 and 24 are disposed on the front side of the backshell 30 and are oriented so as to resist being pulled through the slots 32 and 34.

Figure 5:
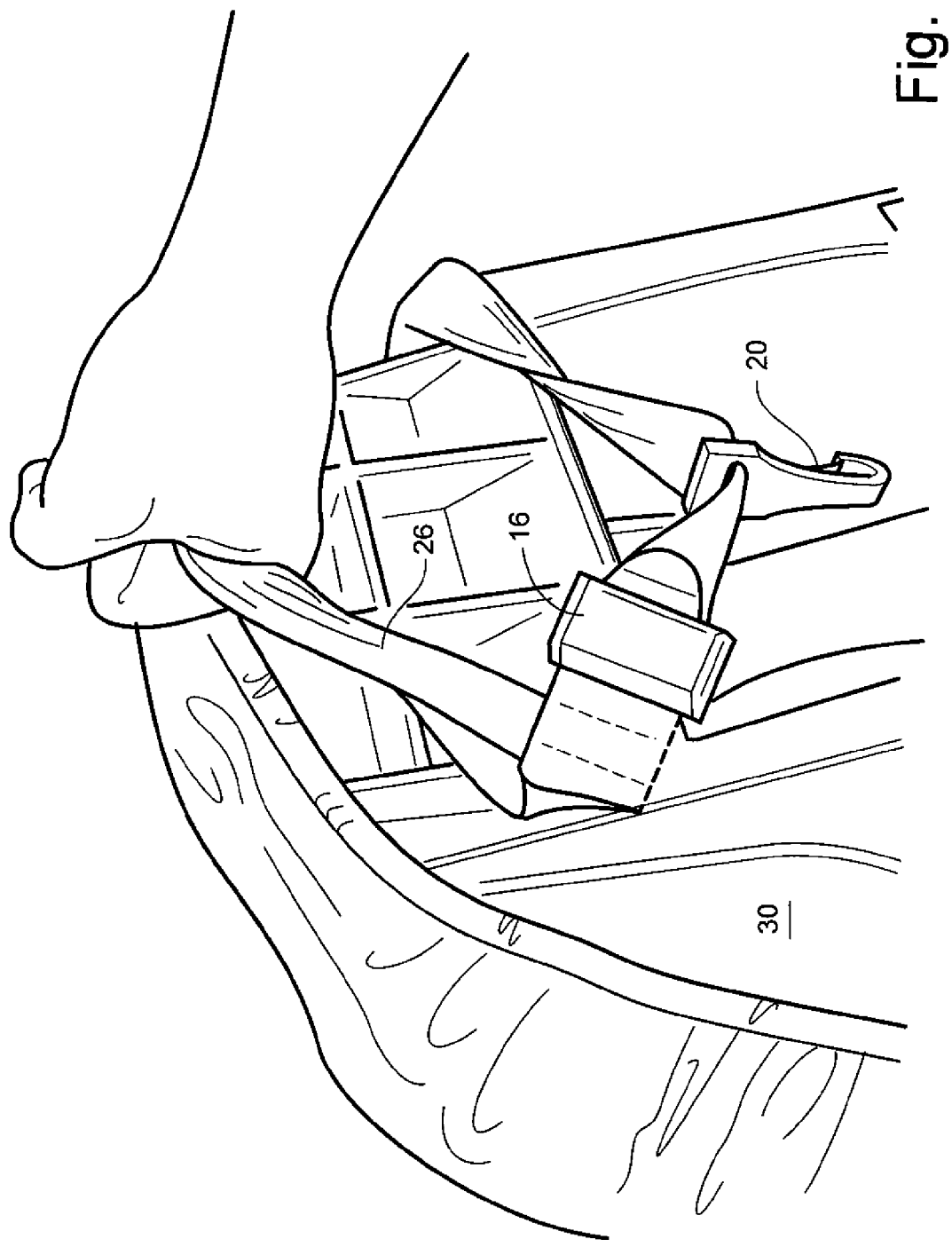
FIG. 5 is a perspective view showing the tether of FIG. 1 being used to carry a child safety seat.
Figure 6:
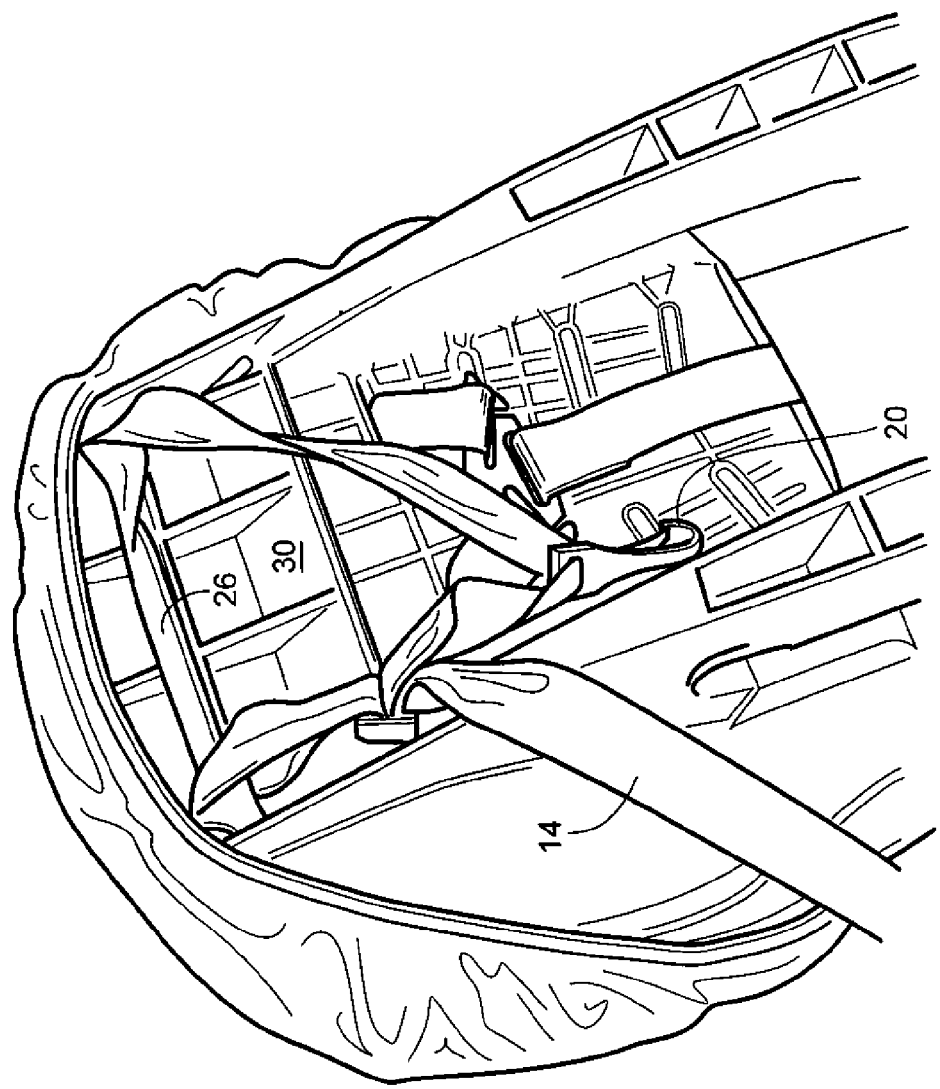
FIG. 6 is a perspective view of a seat with the tether of FIG. 1 after an impact.
Figure 7:
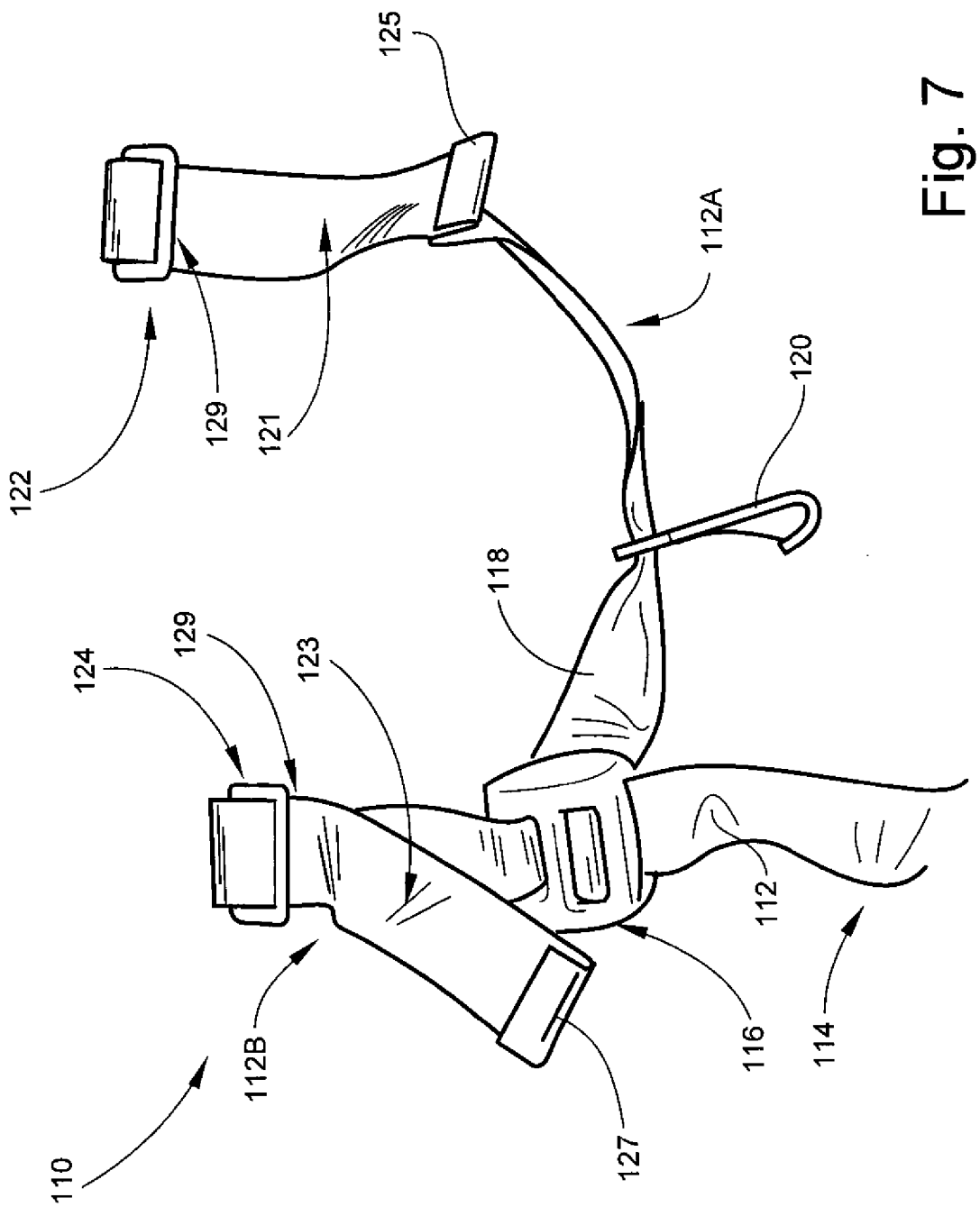
FIG. 7 is a perspective view of a tether constructed in accordance with a second embodiment of the invention.
Figure 8:
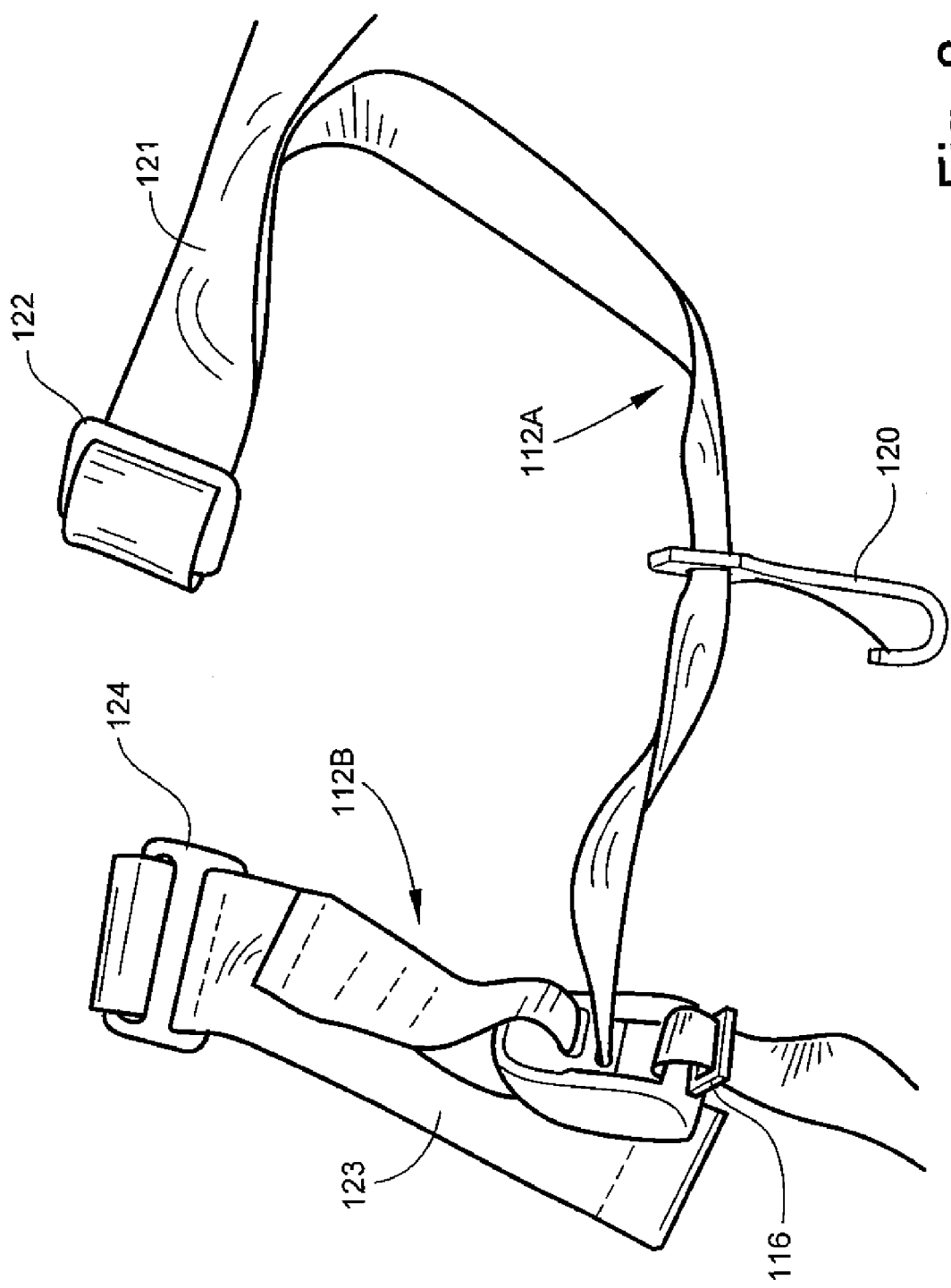
FIG. 8 is another perspective view of the tether of FIG. 7.
Figure 9:
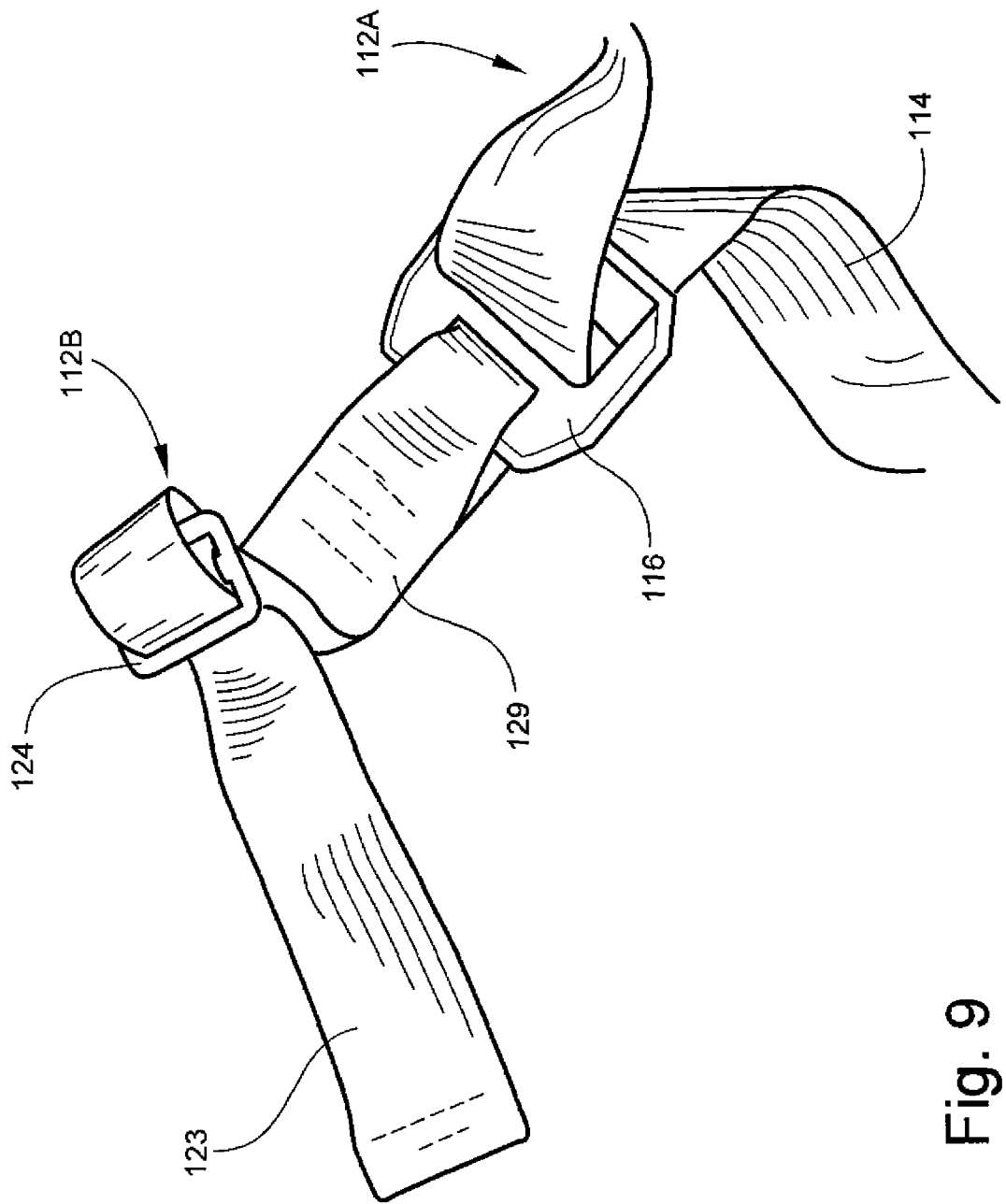
FIG. 9 is another perspective view of the tether of FIG. 7, showing a routing thereof.
Figure 10:
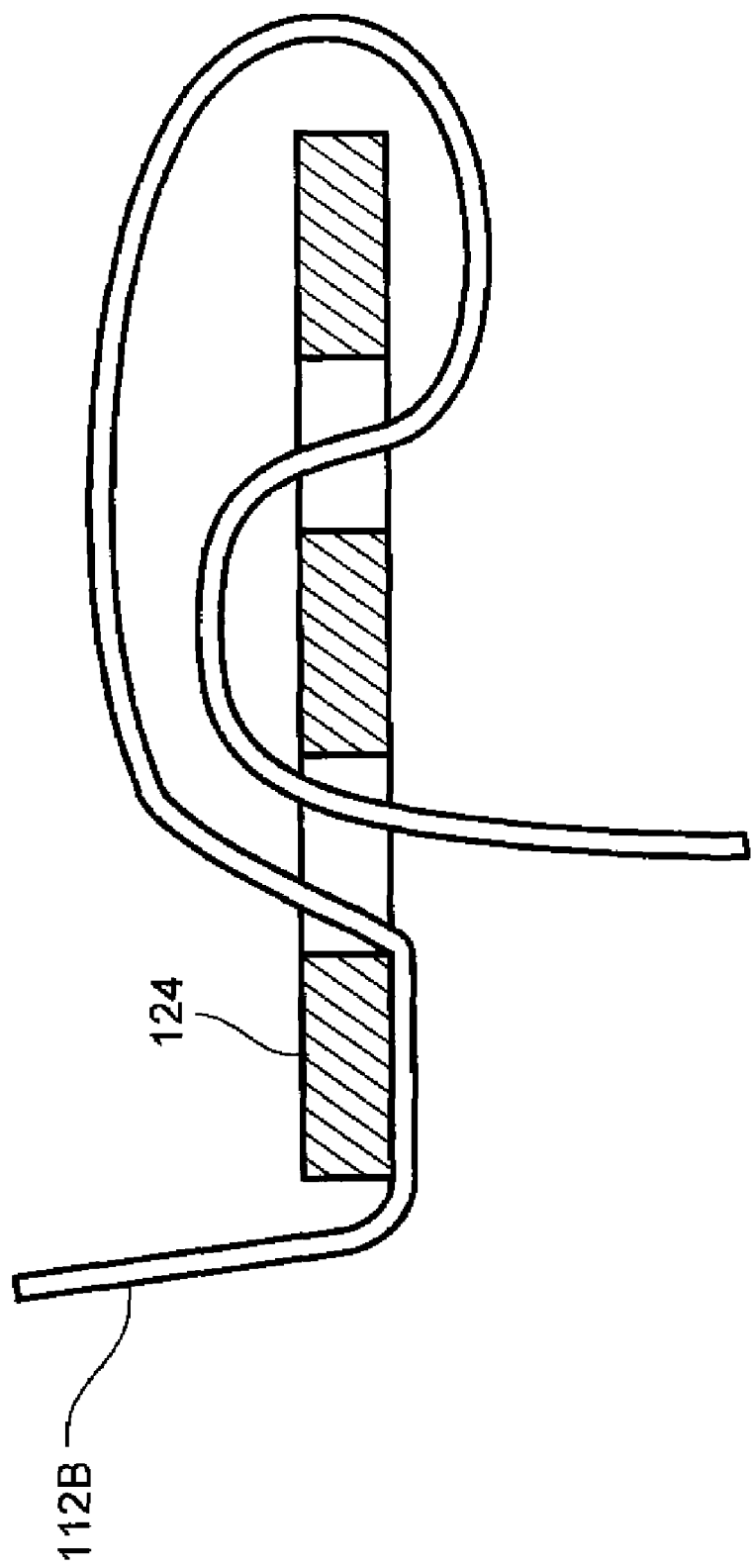
FIG. 10 is a schematic cross-sectional view of a slide of the tether of FIG. 7, showing the routing in more detail.

FIG. 5 shows the carrying handle 26 being used to transport the child safety seat 28. As the carrying handle 26 is pulled, the webbing 12 tends to slip through the slides 22 and 24 such that the loop 18 effectively becomes shorter.

In use, child safety seat 28 is secured to a vehicle anchor point (such as an upper LATCH anchor, not shown). The free end 14 of the webbing 12 is then pulled through the adjuster 16 to set the length of the loop 18 as desired. In an accident, tension loads will be placed on the loop 18 and the hook 20 as the vehicle decelerates. The webbing 12 stretches as with a conventional tether.

FIGS. 7-10 illustrate a second exemplary embodiment of a tether 110 for use with a child safety seat. It is similar in general construction to the tether 10 described above, and its main components are first and second portions 112A and 112B of webbing, for example nylon or other suitable flexible material. A free end 114 of the first webbing portion 112A is routed through an adjuster 116 of a known type, and then extends laterally to form a loop 118. A hook 120 slides along this loop 118. The first webbing portion 112A is routed through a first slide 122 of a known type, such as a 3-bar slide, and then doubled back to form a first pigtail 121, with an end doubled over as a stop 125 The second webbing portion 112B has one end anchored at a fixed connection to the adjuster 116. The other end is routed through a second slide 124, and then doubled back to form a second pigtail 123, with an end doubled over as a stop 127. Lines of stitching 129 (see FIG. 7) may be provided in the webbing 112 to secure the pigtails 121 and 123 to the webbing 112 and thus prevent the slides 122 and 124 from moving along the webbing 112 prior to an impact.

The webbing portions 112A and 112B are routed through the slides 122 and 124 in a configuration which provides adequate friction to the webbing 112 during sliding. This routing is depicted schematically in FIG. 10.

Figure 11:
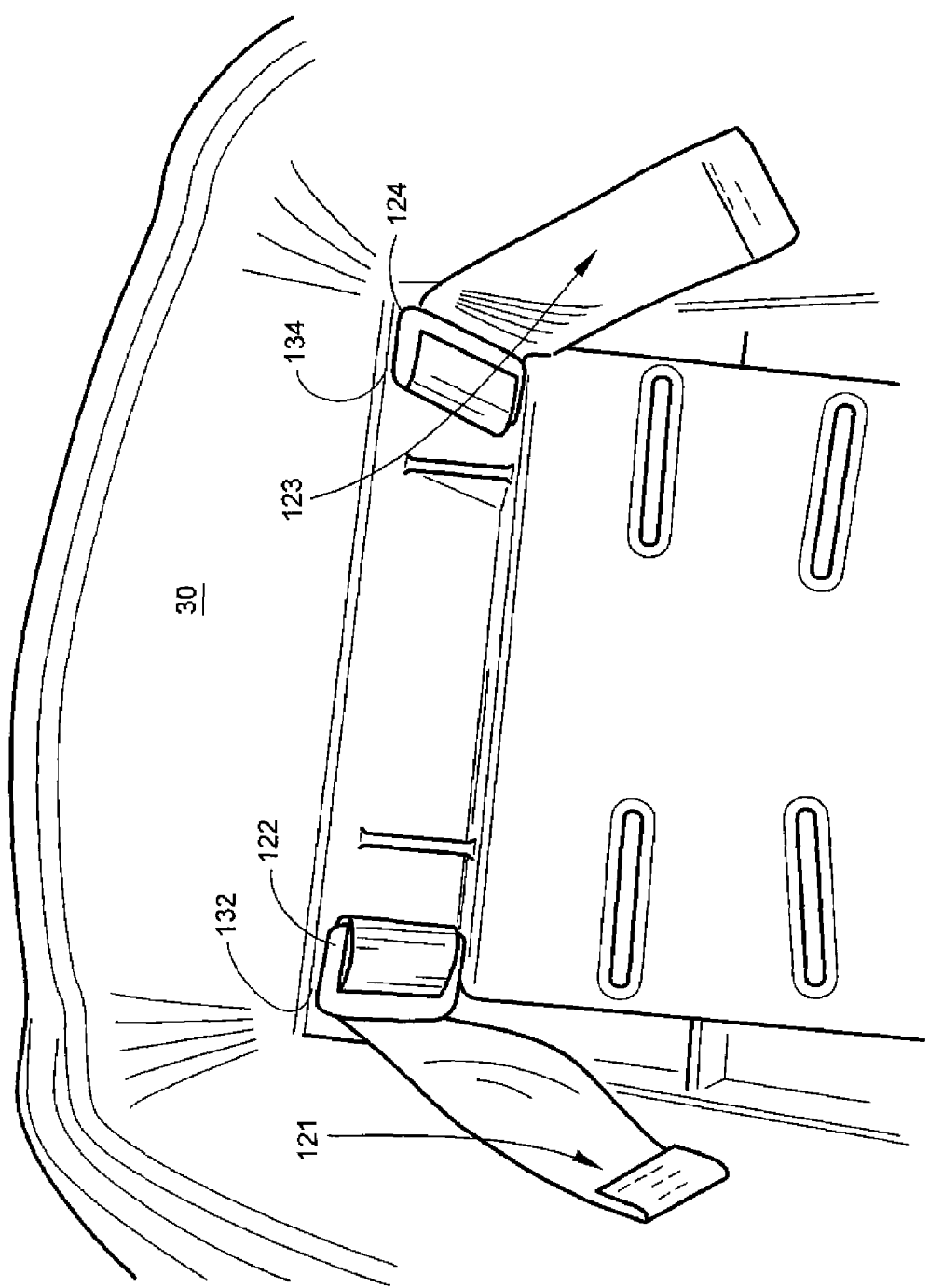
FIG. 11 is a front view of the tether of FIG. 7 attached to a backshell of a child safety seat.
Figure 12:
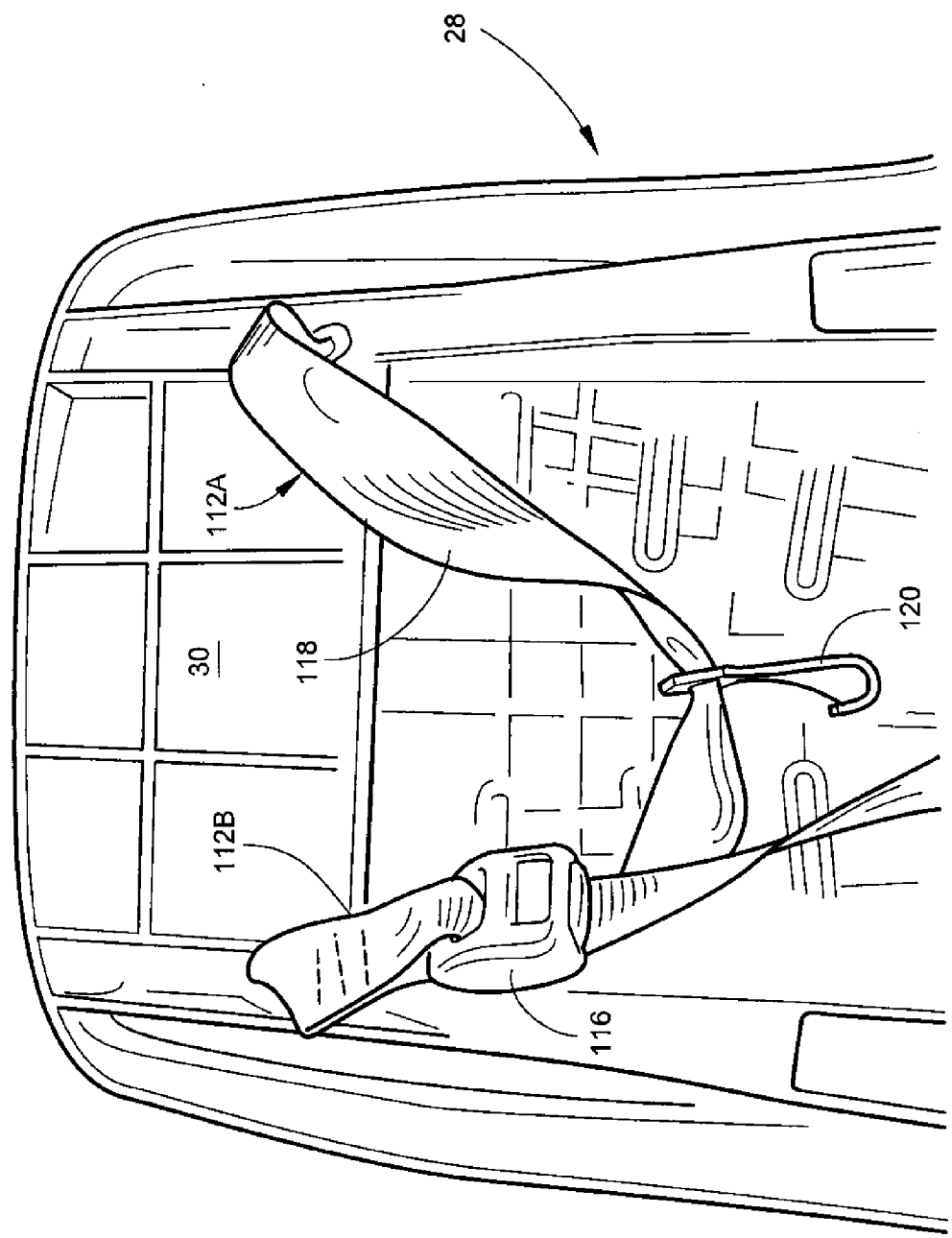
FIG. 12 is a rear view of the tether of FIG. 7 attached to a child safety seat.

FIGS. 11 and 12 show how the tether 110 may be mounted to a child safety seat 28 which includes a backshell 30. The webbing portions 112A and 112B are routed through laterally-spaced-apart slots 132 and 134 in the backshell 30, which are large enough to accept the webbing 112 but smaller than the surface area of the slides 122 and 124. The slides 122 and 124 are disposed on the front side of the backshell 30 and are oriented so as to resist being pulled through the slots 132 and 134. The pigtails 121 and 123 extend freely on the front side of the backshell 30 (i.e. inside the seat 28).

In use, child safety seat 28 is secured to a vehicle anchor point (such as an upper LATCH anchor, not shown). The free end 114 of the first webbing portion 112A is then pulled through the adjuster 116 to set the length of the loop 118 to the desired tension. In an accident, tension loads will be placed on the loop 118 and the hook 120 as the vehicle decelerates. The webbing 112 stretches as with a conventional tether. The webbing portions 112A and 112B will also slip through the slides 122 and 124 when the stitching 129 breaks, tending to increase the length of the loop 118 and shorten the pigtails 121 and 123. This absorbs some energy by overcoming friction and allowing the length of the loop 118 to increase. The total slippage is restricted by the stops 125 and 127 contacting the backshell 30 (see FIG. 12).

Figure 13:
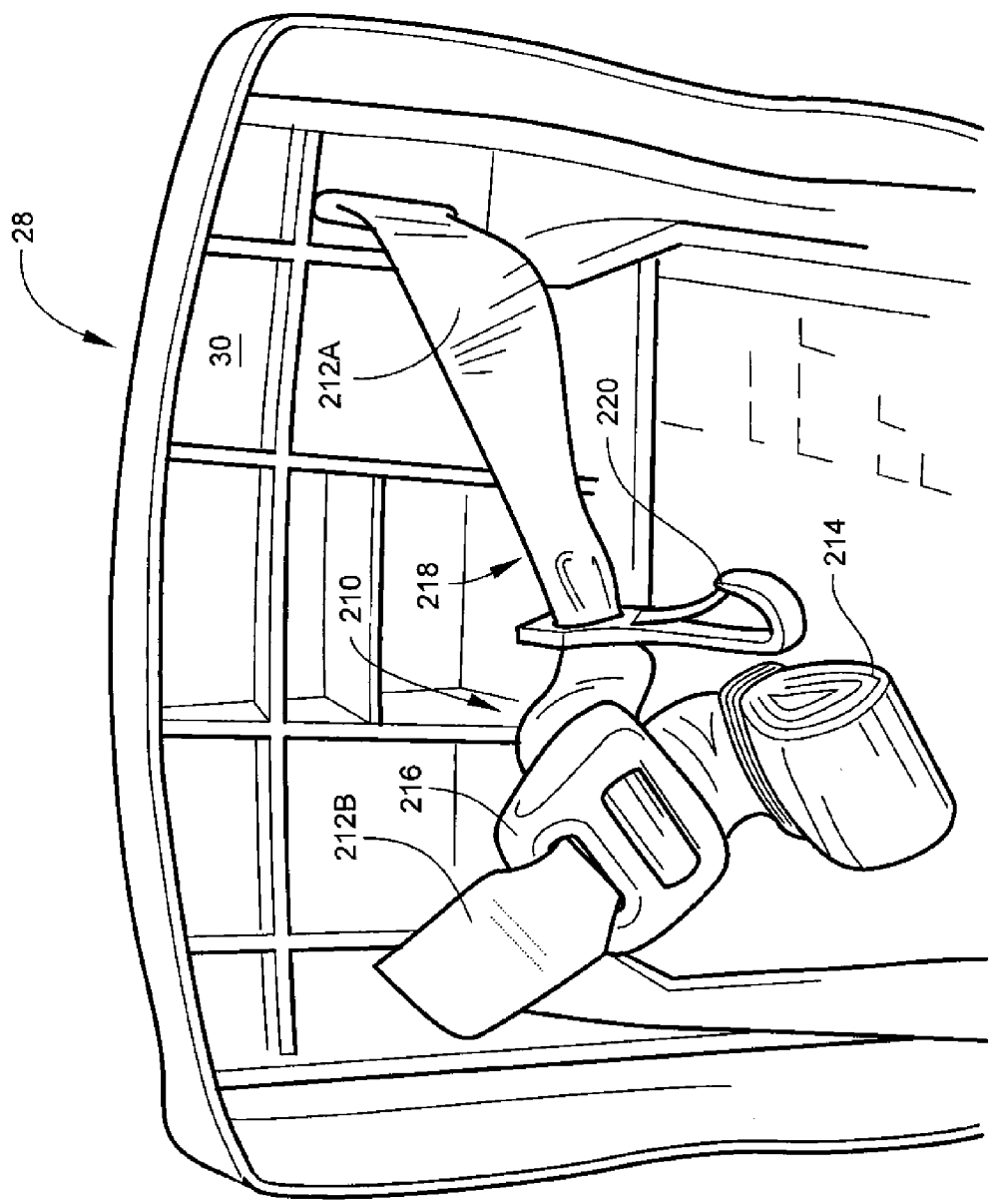
FIG. 13 is a rear view of a tether constructed in accordance with another embodiment of the invention, attached to a child safety seat.
Figure 14:
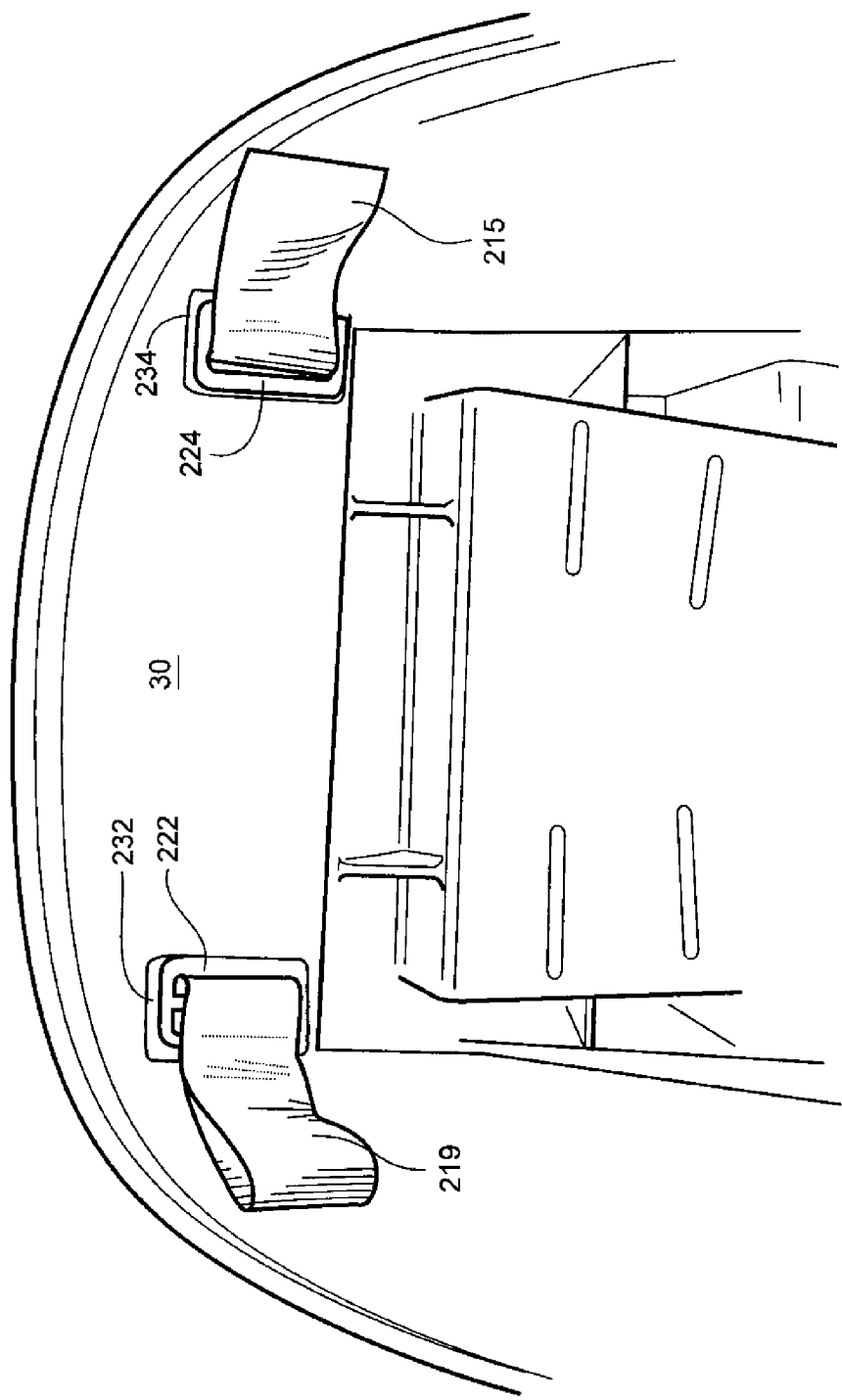
FIG. 14 is a front view of the tether of FIG. 13.
Figure 15:
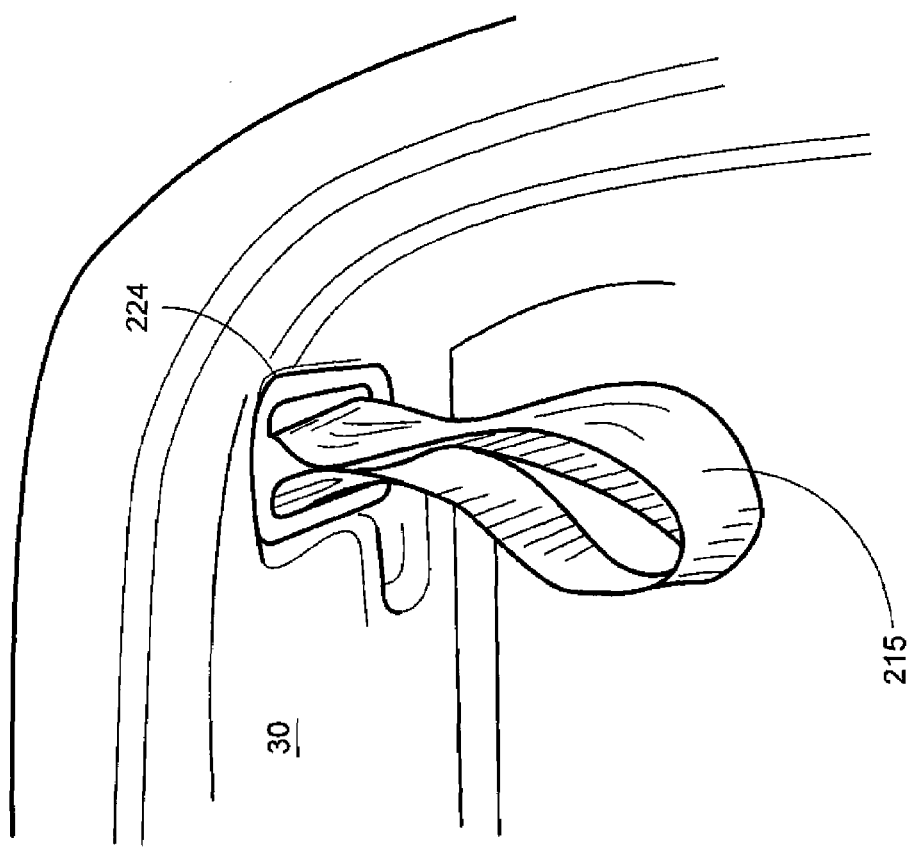
FIG. 15 is an enlarged front view of a portion of the tether of FIG. 13.

FIGS. 13-15 illustrate a third exemplary embodiment of a tether 210 for use with a child safety seat. It is similar in general construction to the tether 110 described above, and its main components are first and second portions 212A and 212B of webbing, for example nylon or other suitable flexible material. A free end 214 of the first webbing portion 212A is routed through an adjuster 216 of a known type, and then extends laterally to form a loop 218. A hook 220 slides along this loop 218. The first webbing portion 212A is routed through a first slide 222 of a known type, such as a 3-bar slide (see FIG. 14). The second webbing portion 212B has one end anchored at a fixed connection to the adjuster 216. The other end is routed through a second slide 224.

Figure 16:
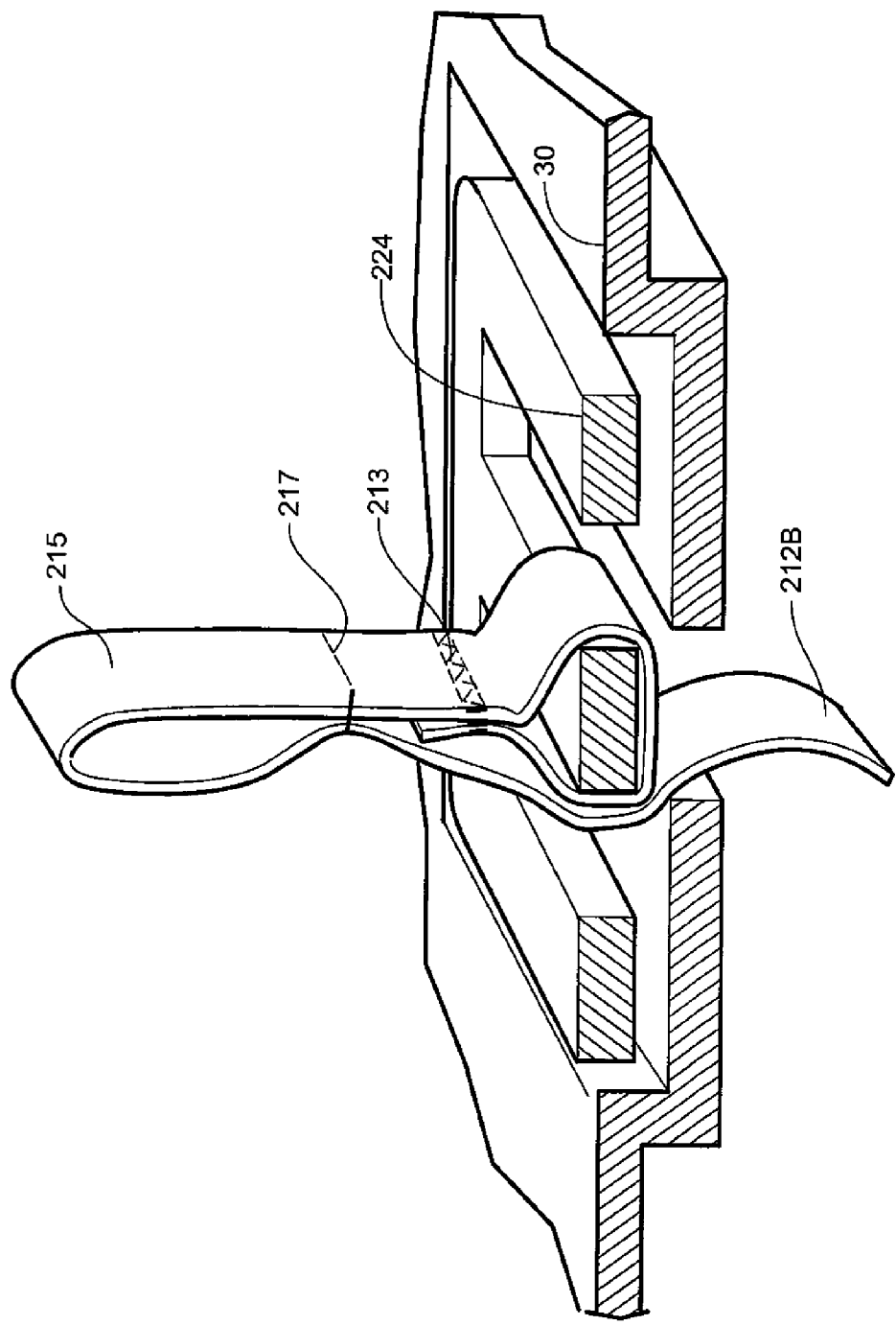
FIG. 16 is a fragmentary perspective view of a slide shown in FIG. 13, showing a routing of webbing therethrough.

The webbing portions 212A and 212B are routed through the slides 222 and 224. FIG. 16 is a schematic depiction of the routing of the second webbing portion 212B, which is representative of the routing of the other webbing portion 212A. The second webbing portion 212B is looped over the central bar of the second slide 224 and anchored thereto, for example by using a strong pattern of permanent stitching depicted at 213. The free end of the webbing portion 212B is formed into a slack loop 215 which is secured to the remainder of the webbing portion 212B by a frangible connection such as a single stitching line, depicted at 217. A similar slack loop 219 (see FIG. 14) is formed in the first webbing portion 212A.

FIG. 15 shows how the tether 210 may be mounted to a child safety seat 28 which includes a backshell 30. The webbing portions 212A and 212B are routed through laterally-spaced-apart slots 232 and 234 in the backshell 30, which are large enough to accept the webbing 212 but smaller than the surface area of the slides 222 and 224 The slides 222 and 224 are disposed on the front side of the backshell 30 and are oriented so as to resist being pulled through the slots 232 and 234 The slack loops 215 and 219 and extend freely on the front side of the backshell 30 (i.e. inside the seat 28).

In use, child safety seat 28 is secured to a vehicle anchor point (such as an upper LATCH anchor, not shown). The free end 214 of the first webbing portion 212A is then pulled through the adjuster 216 to set the length of the loop 218 to the desired tension. In an accident, tension loads will be placed on the loop 218 and the hook 220 as the vehicle decelerates. The webbing 212 stretches as with a conventional tether. The webbing portions 212A and 212B will also slip through the slides 222 and 224 when the frangible connection 217 breaks, tending to increase the length of the loop 218 and pull out the slack loops 215 and 219. This absorbs some energy by overcoming friction and allowing the length of the loop 218 to increase. The total slippage is restricted by the secure anchorage of the webbing portions 212A and 212B to the slides 222 and 224.

Figure 17:
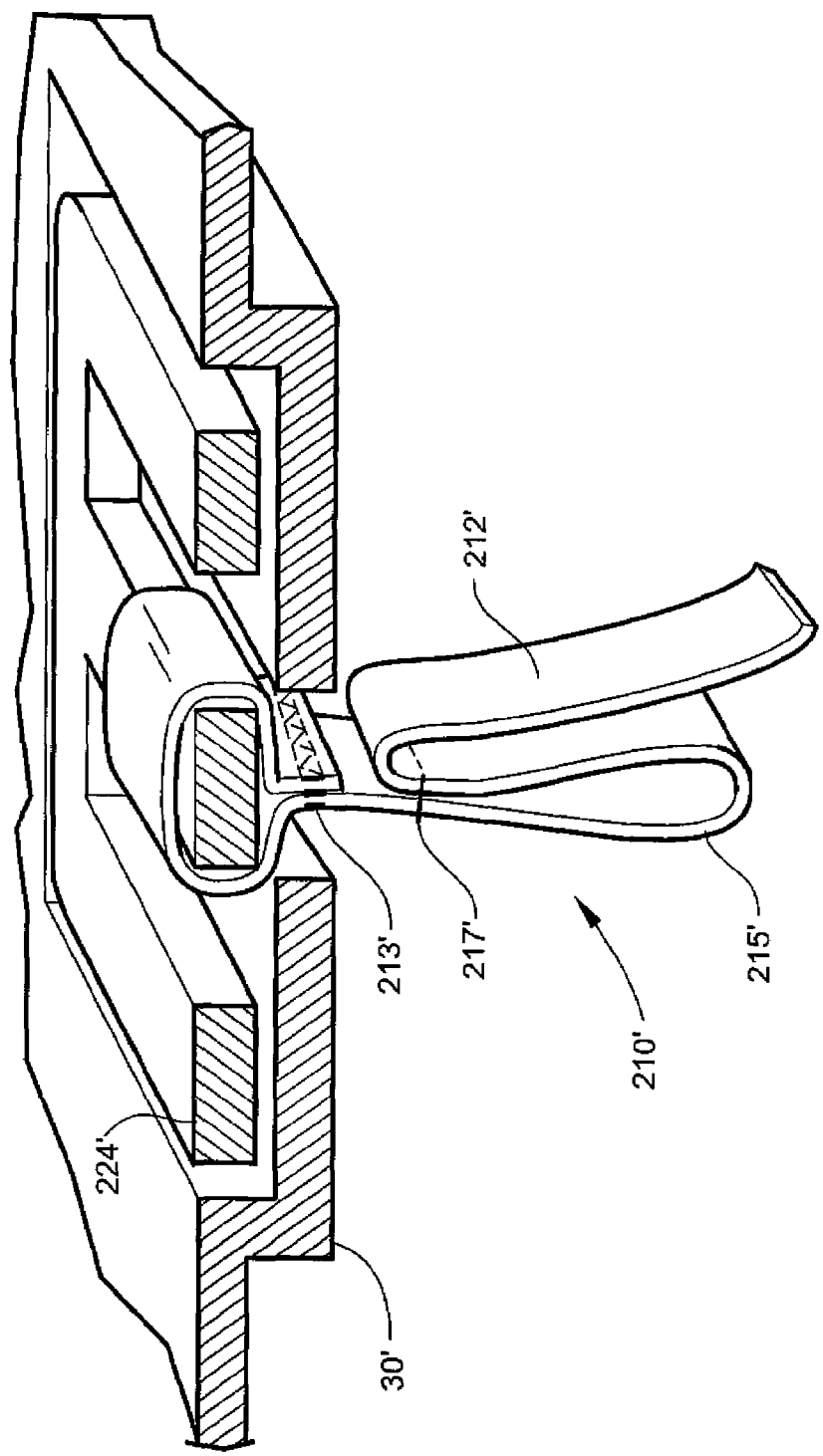
FIG. 17 is a fragmentary perspective view of an alternative routing of webbing through a slide.

FIG. 17 is a schematic depiction of a tether 210' similar to the tether 210 but using an alternative routing of webbing 212'. In this embodiment, webbing 212' is looped over the central bar of the a slide 224' and anchored thereto, for example by using a strong pattern of permanent stitching depicted at 213'. Downstream of the slide 224', the webbing 212' is formed into a slack loop 215' which is secured to the remainder of the webbing 212' by a frangible connection such as a single stitching line, depicted at 217'. When anchored in a backshell 30, the slack loop 215' and the free end of the webbing 212' both extend from the rear side of the backshell 30. In an accident, the frangible connection 217' will break, tending to increase the length of the tether 210' and pull out the slack loop'. This absorbs some energy by allowing the length of the webbing 212' available for stretching to increase. The total slippage is restricted by the secure anchorage of the webbing 212' to the slide 224'.

An important benefit of the tethers described above over prior art tethers is the ability of the webbing to slip through the slides and/or increase its length upon impact. This provides energy absorption benefits in two ways. First, energy is used to overcome friction as the webbing slips through the slides as described above. Second, by allowing more webbing to slip through the slides, the total length of webbing that is available to stretch is greater than the amount available if slipping did not occur. More webbing stretch or elongation allows for greater energy absorption.

The foregoing has described an energy-absorbing tether for a child safety seat. While specific embodiments of the present invention have been described, it will be apparent to those skilled in the art that various modifications thereto can be made without departing from the spirit and scope of the invention. The principles of allowing webbing to slide with frictional resistance and/or of providing additional tether length for stretching in a crash are not limited to a tether strap having two mounting points. It may be applied to a tether having a single mounting point, or other kinds of straps and harnesses used with child safety seats. Accordingly, the foregoing description of the preferred embodiment of the invention and the best mode for practicing the invention are provided for the purpose of illustration only and not for the purpose of limitation.

We claim:

1. An energy absorbing tether assembly for use with a child safety seat having a plastic shell with a seat bottom portion and a seat back portion, for restraining the child safety seat to a vehicle seat to which it is tethered by the tether assembly, the assembly comprising:
   (a) a first length of webbing for routing through an adjuster on a front side of the seat back of the shell;
   (b) a second length of webbing fixed to the adjuster;
   (c) a first web-retaining slide positioned on the first length of webbing and residing in a first recess surrounding a first slot in the seat back portion of the shell;
   (d) a second web-retaining slide positioned on the second length of webbing and residing in a second recess surrounding a second slot laterally spaced-apart from the first slot;
   (e) a first line of stitching extending through and forming a doubled, folded segment of the first length of webbing on the front side of the shell;
   (f) a second line of stitching extending through and forming a doubled, folded segment of the second length of webbing on the front side of the shell;
   (g) a hook attached to the webbing for tethering the child safety seat to the vehicle seat; and
   (h) the first and second lines of stitching on the respective first and second lengths of webbing adapted to break during a forward vehicle impact to increase the first and second lengths of webbing at a controlled rate as the first and second lines of stitching break to thereby reduce forces on the first and second lengths of webbing and on a safety seat occupant.

2. An assembly according to claim 1 wherein the first and second web-retaining slides are three bar slides.

3. An assembly according to claim 1 wherein the first and second web-retaining slides are larger than the first and second slots.

4. A tether assembly according to claim 1 wherein one of the first or second lines of stitching define slack loops on the front side of the shell.

5. A child safety seat having an energy absorbing tether assembly for restraining the child safety seat to a vehicle seat to which it is tethered by the tether assembly, the child safety seat comprising:
   (a) a plastic shell with a seat bottom portion and a seat back portion;
   (b) a first length of webbing for routing through an adjuster on a front side of the seat back of the shell;
   (c) a second length of webbing fixed to the adjuster;
   (d) a first web-retaining slide positioned on the first length of webbing and residing in a first recess surrounding a first slot in the seat back portion of the shell;
   (e) a second web-retaining slide positioned on the second length of webbing and residing in a second recess surrounding a second slot laterally spaced-apart from the first slot;

(f) a first line of stitching extending through and forming a doubled, folded segment of the first length of webbing on the front side of the shell;

(g) a second line of stitching extending through and forming a doubled, folded segment of the second length of webbing on the front side of the shell;

(h) a hook attached to the webbing for tethering the child safety seat to the vehicle seat; and (i) the first and second lines of stitching on the respective first and second lengths of webbing adapted to break during a forward vehicle impact to increase the first and second lengths of webbing at a controlled rate as the first and second lines of stitching break to thereby reduce forces on the first and second lengths of webbing and on a safety seat occupant.

6. The child safety seat according to claim 5 wherein the first and second web-retaining slides are three bar slides.

7. The child safety seat according to claim 5 wherein the first and second web-retaining slides are larger than the first and second slots.

8. The child safety seat according to claim 5 wherein one of the first or second lines of stitching define slack loops on the front side of the shell.

* * * * *